US012191065B2

(12) United States Patent
Ishida et al.

(10) Patent No.: US 12,191,065 B2
(45) **Date of Patent: *Jan. 7, 2025**

(54) METAL MAGNETIC PARTICLE, INDUCTOR, METHOD FOR MANUFACTURING METAL MAGNETIC PARTICLE, AND METHOD FOR MANUFACTURING METAL MAGNETIC CORE

(71) Applicant: Murata Manufacturing Co., Ltd., Kyoto-fu (JP)

(72) Inventors: Takuya Ishida, Nagaokakyo (JP); Makoto Yamamoto, Nagaokakyo (JP); Katsutoshi Uji, Nagaokakyo (JP); Yuya Ishida, Nagaokakyo (JP); Mitsuru Odahara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 356 days.

This patent is subject to a terminal disclaimer.

(21) Appl. No.: 17/201,801

(22) Filed: Mar. 15, 2021

(65) Prior Publication Data

US 2021/0304946 A1 Sep. 30, 2021

(30) Foreign Application Priority Data

Mar. 27, 2020 (JP) ................................ 2020-058368

(51) Int. Cl.
*H01F 1/147* (2006.01)
*H01F 1/20* (2006.01)
(Continued)

(52) U.S. Cl.
CPC ........... *H01F 27/255* (2013.01); *H01F 1/147* (2013.01); *H01F 41/0246* (2013.01)

(58) Field of Classification Search
CPC .............. H01F 1/147; H01F 1/24; H01F 1/33; H01F 27/255; H01F 3/08; H01F 41/0246
See application file for complete search history.

(56) References Cited

U.S. PATENT DOCUMENTS

2012/0082844 A1* 4/2012 Takahashi ................ H01F 1/33 428/336
2018/0374619 A1* 12/2018 Orimo ...................... B22F 1/16
(Continued)

FOREIGN PATENT DOCUMENTS

CN 109119222 A 1/2019
CN 110246651 A 9/2019
(Continued)

*Primary Examiner* — Holly Rickman
*Assistant Examiner* — Linda N Chau
(74) *Attorney, Agent, or Firm* — Studebaker & Brackett PC

(57) ABSTRACT

A metal magnetic particle provided with an oxide layer on a surface of an alloy particle containing Fe and Si, wherein the oxide layer has a first oxide layer, a second oxide layer, and a third oxide layer from the alloy particle side. Also, in line analysis of element content by using a scanning transmission electron microscope-energy dispersive X-ray spectroscopy, the first oxide layer is a layer where Si content takes a local maximum value, the second oxide layer is a layer where Fe content takes a local maximum value, and the third oxide layer is a layer where Si content takes a local maximum value.

15 Claims, 3 Drawing Sheets

(51) Int. Cl.

| | |
|---|---|
| ***H01F 1/22*** | (2006.01) |
| ***H01F 1/24*** | (2006.01) |
| ***H01F 27/255*** | (2006.01) |
| ***H01F 41/02*** | (2006.01) |

(56) References Cited

U.S. PATENT DOCUMENTS

2019/0279801 A1* 9/2019 Yoshidome ............... H01F 1/38
2020/0312522 A1* 10/2020 Kurahashi ........... H01F 1/14791

FOREIGN PATENT DOCUMENTS

| | | | |
|---|---|---|---|
| JP | 2011-249774 | A | 12/2011 |
| JP | 4866971 | B2 | 2/2012 |
| JP | 5082002 | B1 | 11/2012 |
| JP | 2014-143286 | A | 8/2014 |
| JP | 2018-011043 | A | 1/2018 |
| JP | 2018-037635 | A | 3/2018 |
| JP | 2019-009307 | A | 1/2019 |
| JP | 2019-160943 | A | 9/2019 |
| JP | 2021-158261 | A | 10/2021 |
| WO | 2016/056351 | A1 | 4/2016 |

* cited by examiner

METAL MAGNETIC PARTICLE, INDUCTOR, METHOD FOR MANUFACTURING METAL MAGNETIC PARTICLE, AND METHOD FOR MANUFACTURING METAL MAGNETIC CORE

CROSS-REFERENCE TO RELATED APPLICATION

This application claims benefit of priority to Japanese Patent Application No. 2020-058368, filed Mar. 27, 2020, the entire content of which is incorporated herein by reference.

BACKGROUND

Technical Field

The present disclosure relates to a metal magnetic particle, an inductor, a method for manufacturing a metal magnetic particle, and a method for manufacturing a metal magnetic core.

Background Art

A power inductor to be used in a power supply circuit is required to have a small size, and a low loss, and to deal with a large current, and in order to respond these requirements, it has been studied to use metal magnetic particles having a high saturation magnetic flux density in a magnetic material. The metal magnetic particles have an advantage of having a high saturation magnetic flux density, but since insulation resistance of the material alone is low, it is necessary to ensure insulation between the metal magnetic particles in order to use the metal magnetic particles as a magnetic material of an electronic component. For this reason, various methods for improving insulation properties of the metal magnetic particles have been studied.

For example, Japanese Patent No. 5082002 discloses a method of coating a surface of a metal magnetic particle with an insulating film such as glass. Further, Japanese Patent No. 4866971 discloses a method of forming an oxide layer derived from a material on a surface of a metal magnetic particle.

However, the method described in Japanese Patent No. 5082002 has a problem in that it is difficult to uniformly form an insulating film such as glass on a surface of a metal magnetic particle, and a portion having a thin film thickness serves as a start point of dielectric breakdown.

In addition, the method described in Japanese Patent No. 4866971 has a problem in that insulation reliability is not sufficient because the oxide layer derived from the raw material potentially contains defects. In addition, the metal magnetic material described in Japanese Patent No. 4866971 has a problem in that heat treatment cannot be performed at a high temperature in order to prevent progress of oxidation of the raw material particles.

SUMMARY

Accordingly, the present disclosure provides a metal magnetic particle and an inductor that have excellent insulation properties and direct-current superposition characteristics, a method for manufacturing a metal magnetic particle capable of obtaining a metal magnetic particle having excellent insulation properties and direct-current superposition characteristics, and a method for manufacturing a metal magnetic core capable of obtaining a metal magnetic core having excellent insulation properties and direct-current superposition characteristics.

A metal magnetic particle according to preferred embodiments of the present disclosure is a metal magnetic particle provided with an oxide layer on a surface of an alloy particle containing Fe and Si, the oxide layer includes a first oxide layer, a second oxide layer, and a third oxide layer from a side of the alloy particle. The first oxide layer is a layer in which Si content takes a local maximum value, the second oxide layer is a layer in which Fe content takes a local maximum value, and the third oxide layer is a layer in which Si content takes a local maximum value in line analysis of element content by using a scanning transmission electron microscope-energy dispersive X-ray spectroscopy.

An inductor according to preferred embodiments of the present disclosure includes the metal magnetic particles according to preferred embodiments of the present disclosure.

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing and drying the Si alkoxide, and forming an oxide layer on the surface of the alloy particle by performing heat treatment on the coating film forming particle in an oxidizing atmosphere. An average thickness of the coating film is equal to or larger than 10 nm and equal to or smaller than 30 nm (i.e., from 10 nm to 30 nm), and a temperature of the heat treatment is equal to or higher than 750° C. and equal to or lower than 850° C. (i.e., from 750° C. to 850° C.).

A method for manufacturing a metal magnetic core according to preferred embodiments of the present disclosure includes mixing raw material particles each of which has, on a surface of an alloy particle containing Fe and Si, an Si oxide film and an Fe oxide film from a side of the alloy particle with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is equal to or larger than 10 nm and equal to or smaller than 30 nm (i.e., from 10 nm to 30 nm), and a temperature of the heat treatment is equal to or higher than 750° C. and equal to or lower than 850° C. (i.e., from 750° C. to 850° C.).

Other features, elements, characteristics and advantages of the present disclosure will become more apparent from the following detailed description of preferred embodiments of the present disclosure with reference to the attached drawings.

DETAILED DESCRIPTION

Hereinafter, a metal magnetic particle, an inductor, a method for manufacturing a metal magnetic particle, and a method for manufacturing a metal magnetic core according to the present disclosure will be described.

However, the present disclosure is not limited to the following configurations, and can be appropriately changed and applied without departing from the spirit and scope of the present disclosure. Note that a combination of two or more preferred configurations of the present disclosure to be described below is also an example of the present disclosure.

Metal Magnetic Particle

A metal magnetic particle according to preferred embodiments of the present disclosure is a metal magnetic particle provided with an oxide layer on a surface of an alloy particle containing Fe and Si, the oxide layer includes a first oxide layer, a second oxide layer, and a third oxide layer from a side of the alloy particle. The first oxide layer is a layer in which Si content takes a local maximum value, the second oxide layer is a layer in which Fe content takes a local maximum value, and the third oxide layer is a layer in which Si content takes a local maximum value in line analysis of element content by using a scanning transmission electron microscope-energy dispersive X-ray spectroscopy.

Figure 1:
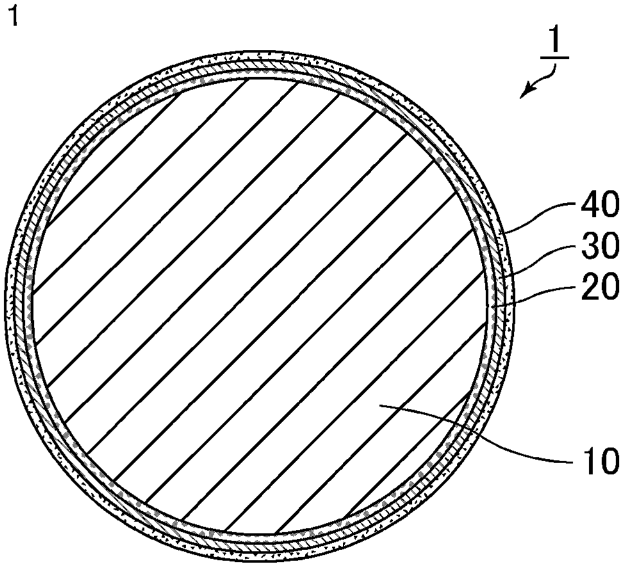
FIG. 1 is a cross-sectional view schematically illustrating an example of a metal magnetic particle according to the present disclosure.

FIG. 1 is a cross-sectional view schematically illustrating an example of the metal magnetic particle according to the present disclosure.

As illustrated in FIG. 1, a metal magnetic particle 1 is provided with an oxide layer on a surface of an alloy particle 10 containing Fe and Si.

The oxide layer is a first oxide layer 20, a second oxide layer 30, and a third oxide layer 40 from the alloy particle 10 side.

The alloy particle contains Fe and Si.

A weight percentage of the Si in the alloy particle is preferably equal to or larger than about 1.5 parts by weight and equal to or smaller than about 8.0 parts by weight (i.e., from about 1.5 parts by weight to about 8.0 parts by weight) with respect to 100 parts by weight of a total weight of the Fe and the Si.

When the weight percentage of the Si in the alloy particle is smaller than about 1.5 parts by weight, the loss reduction effect is poor. On the other hand, when the weight percentage of the Si in the alloy particle is larger than about 8.0 parts by weight, saturation magnetization is largely decreased, and direct-current superposition characteristics are reduced.

The alloy particle may contain Cr in addition to the Fe and the Si.

The alloy particle preferably contains smaller than about 1.0 part by weight of Cr with respect to 100 parts by weight of the total weight of the Fe and the Si, more preferably contains equal to or smaller than about 0.9 parts by weight of Cr, and still more preferably does not contain Cr. When the Cr content is small, a saturation magnetic flux density is improved, and thus the direct-current superposition characteristics are improved.

The alloy particle may contain the same element as impurity contained in pure iron as an impurity component.

Examples of the impurity component include C, Mn, P, S, Cu, Al, and the like.

The oxide layer has the first oxide layer, the second oxide layer, and the third oxide layer from the alloy particle side.

The oxide layer herein means a layer in which both oxygen and metal elements (including silicon (Si) in the metal elements herein) are counted in line analysis of element content to be described below. When both oxygen and silicon are counted, it is considered that oxide containing silicon is present, and when both oxygen and iron (Fe) are counted, it is considered that oxide containing iron is present.

The first oxide layer is a layer in which Si content takes a local maximum value in line analysis of element content (hereinafter also simply referred to as line analysis) using the scanning transmission electron microscope (STEM)-energy dispersive X-ray spectroscopy (EDX). The second oxide layer is a layer in which Fe content takes a local maximum value in the line analysis. The third oxide layer is a layer in which Si content takes a local maximum value in the line analysis.

Boundaries among the first oxide layer, the second oxide layer, and the third oxide layer are defined as follows.

The first oxide layer is defined from a point at which the Fe content and the Si content are reversed (a first boundary) to a point where the Si content and the Fe content are reversed (a second boundary) in the line analysis of element content using the STEM-EDX.

In the line analysis of element content using the STEM-EDX, the second oxide layer is defined from the second boundary to a point at which the Fe content and the Si content are reversed (a third boundary).

The third oxide layer is defined from the third boundary in the line analysis of element content using the STEM-EDX to a point where O content (oxygen content) in the line analysis becomes about 34% of the maximum value (a fourth boundary).

Note that the "content" of each element in the line analysis of element content using the STEM-EDX is a count number (also referred to as a net count) of X-rays unique to each element, and does not indicate a weight ratio or an atomic ratio.

Further, the magnification in the STEM-EDX is 400000 times.

A thickness of the first oxide layer is preferably larger than or equal to about 4 nm and smaller than or equal to about 10 nm (i.e., from about 4 nm to about 10 nm), and more preferably larger than or equal to about 5 nm and smaller than or equal to about 8 nm (i.e., from about 5 nm to about 8 nm).

In the line analysis of element content using the STEM-EDX, a ratio of the Fe content to the Si content (Fe content/Si content) at a point where the Si content of the first oxide layer takes the local maximum value is preferably equal to or larger than about 0.2 and equal to or smaller than about 0.5 (i.e., from about 0.2 to about 0.5), and more preferably equal to or larger than about 0.3 and equal to or smaller than about 0.4 (i.e., from about 0.3 to about 0.4).

A thickness of the second oxide layer is preferably larger than or equal to about 10 nm and smaller than or equal to about 16 nm (i.e., from about 10 nm to about 16 nm), and more preferably larger than or equal to about 13 nm and smaller than or equal to about 15 nm (i.e., from about 13 nm to about 15 nm).

In the line analysis of element content using the STEM-EDX, a ratio of the Fe content to the Si content (Fe content/Si content) at a point where the Fe content of the second oxide layer takes the local maximum value is preferably equal to or larger than about 22 and equal to or smaller than about 27 (i.e., from about 22 to about 27), and more preferably equal to or larger than about 24 and equal to or smaller than about 26 (i.e., from about 24 to about 26).

A thickness of the third oxide layer is preferably larger than or equal to about 9 nm and smaller than or equal to about 15 nm (i.e., from about 9 nm to about 15 nm), and more preferably larger than or equal to about 10 nm and smaller than or equal to about 13 nm (i.e., from about 10 nm to about 13 nm).

In the line analysis of element content using the STEM-EDX, a ratio of the Fe content to the Si content (Fe content/Si content) at a point where the Si content of the third oxide layer takes the local maximum value is preferably equal to or larger than about 0.01 and equal to or smaller than about 0.20 (i.e., from about 0.01 to about 0.20), and more preferably equal to or larger than about 0.04 and equal to or smaller than about 0.10 (i.e., from about 0.04 to about 0.10).

The metal magnetic particle according to the present disclosure may further include a fourth oxide layer provided on a surface of the third oxide layer.

Note that the fourth oxide layer indicates a layer in which a local maximum value of Fe content is equal to or larger than about 10% of the local maximum value of the Fe content in the second oxide layer by the line analysis to be described later.

Figure 2:
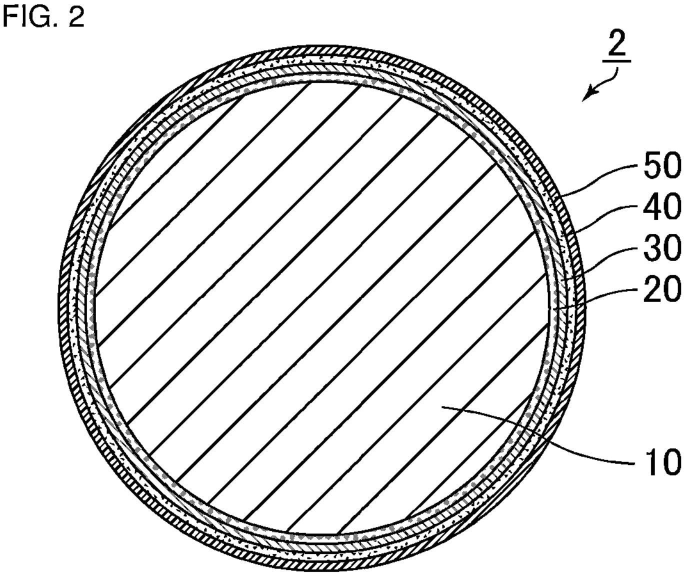
FIG. 2 is a cross-sectional view schematically illustrating another example of the metal magnetic particle according to the present disclosure.

FIG. 2 is a cross-sectional view schematically illustrating another example of the metal magnetic particle according to the present disclosure.

A metal magnetic particle 2 is provided with an oxide layer on a surface of the alloy particle 10 containing Fe and Si.

The oxide layer is the first oxide layer 20, the second oxide layer 30, the third oxide layer 40, and the fourth oxide layer 50 from the alloy particle 10 side.

In the line analysis of element content using the STEM-EDX, the fourth oxide layer is a layer in which Fe content takes a local maximum value.

When the fourth oxide layer is formed, a boundary between the third oxide layer and the fourth oxide layer is defined as follows.

In the line analysis of element content using the STEM-EDX, the third oxide layer is defined from the third boundary to a point at which the Si content and the Fe content are reversed (a fourth boundary).

The fourth oxide layer is defined from the fourth boundary to a point at which 0 content (oxygen content) becomes about 34% of the maximum value (a fifth boundary).

A thickness of the fourth oxide layer is preferably equal to or larger than about 4.0 nm and equal to or smaller about 10.0 nm (i.e., from about 4.0 nm to about 10.0 nm), and more preferably equal to or larger than about 5.0 nm and equal to or smaller than about 7.5 nm (i.e., from about 5.0 nm to about 7.5 nm).

In the line analysis of element content using the STEM-EDX, a ratio of the Fe content to the Si content (Fe content/Si content) is preferably equal to or larger than about 23 and equal to or smaller than about 28 (i.e., from about 23 to about 28) at the point where the Fe content of the fourth oxide layer takes the local maximum value.

Note that the thicknesses of the first oxide layer, the second oxide layer, the third oxide layer, and the fourth oxide layer are determined by performing the line analysis of each of three positions at which a length of an outer periphery of the metal magnetic particle is equally divided by three in an enlarged image obtained by observing a cross-section of the metal magnetic particle by the STEM-EDX, determining the thicknesses of the respective layers, and then determining averages of the thicknesses at the three positions. Further, a ratio of the Fe content to the Si content in each layer (Fe content/Si content) is also determined as an average value of the measured values obtained by the line analysis at the three positions in a similar manner.

In the metal magnetic particle according to the present disclosure, it is preferable that the adjacent oxide layers have different crystallinity.

For example, when the first oxide layer is amorphous, the second oxide layer is preferably crystalline, the third oxide layer is preferably amorphous, and the fourth oxide layer is preferably crystalline.

By joining the amorphous oxide layer and the crystalline oxide layer, the electrical resistance at the joining interface is increased. Therefore, when the crystallinity of the adjacent oxide layers is different, the insulation resistance can be increased.

The crystallinity of each layer can be confirmed by whether or not a periodic light and dark pattern appears in an FFT image obtained by performing Fourier-transformation on an STEM image. In a case of being crystalline, the periodic light and dark pattern appears in the FFT image, and in a case of being amorphous, the periodic light and dark pattern does not appear in the FFT image.

Inductor

An inductor according to preferred embodiments of the present disclosure includes the metal magnetic particles according to preferred embodiments of the present disclosure.

The inductor according to the present disclosure includes the metal magnetic particles according to the present disclosure, and thus has a high withstand voltage and excellent direct-current superposition characteristics.

The inductor according to the present disclosure includes, for example, the metal magnetic particles according to the present disclosure, and a winding disposed around the metal magnetic particles.

The material, the wire diameter, the number of turns, and the like of the winding are not particularly limited, and may be selected according to the desired characteristics.

The metal magnetic particles configuring the inductor according to the present disclosure may be molded into a predetermined shape. The metal magnetic particles molded into the predetermined shape are also referred to as a metal magnetic core. Therefore, an inductor including a metal magnetic core made of the metal magnetic particles according to the present disclosure and a winding disposed around the metal magnetic core is also the inductor according to the present disclosure.

Method for Manufacturing Metal Magnetic Particle

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing and drying the Si alkoxide, and forming an oxide layer on the surface of the alloy particle by performing heat treatment on the coating film forming particle in an oxidizing atmosphere. An average thickness of the coating film is equal to or larger than 10 nm and equal to or smaller than 30 nm (i.e., from 10 nm to 30 nm), and a temperature of the heat treatment is equal to or higher than 750° C. and equal to or lower than 850° C. (i.e., from 750° C. to 850° C.).

In the method for manufacturing the metal magnetic particle according to the present disclosure, the coating film containing the silicon oxide is formed on the surface of the raw material particle having the Si oxide film and the Fe oxide film on the surface of the alloy particle, and the coating film is subjected to the heat treatment in the oxidizing atmosphere. As a result, it is considered that the Si oxide film serves as the first oxide layer, the Fe oxide film serves as the second oxide layer, and the coating film serves as the third oxide layer.

From this, the metal magnetic particle according to the present disclosure can be obtained by using the method for manufacturing the metal magnetic particle according to the present disclosure.

Note that, in the method for manufacturing the metal magnetic particle according to the present disclosure, it is possible to control whether to form the fourth oxide layer by adjusting a film thickness of the coating film or conditions of the heat treatment. Details will be described later.

Mixing Raw Material Particle with Si Alkoxide and Alcohol

First, a raw material particle having, on a surface of an alloy particle containing Fe and Si, an Si oxide film and an Fe oxide film from the alloy particle side is prepared.

A method for forming the Si oxide film and the Fe oxide film on the surface of the alloy particle is not particularly limited, but a method for gradually oxidizing a fine particle of an FeSi alloy obtained by a water atomization method or the like is exemplified.

The gradual oxidation is a process in which the surface of the alloy particle is intentionally oxidized for the purpose of suppressing excessive oxidation of the alloy particle, and a surface oxide film functioning as a protective film for oxidation is formed.

For example, for a dried FeSi alloy particle placed in a non-oxidizing atmosphere, an oxygen concentration in the atmosphere is gradually increased to gradually oxidize a surface of the FeSi alloy particle, and the Si oxide film and the Fe oxide film are formed on the surface of the alloy particle.

The alloy particle to be used in the method for manufacturing the metal magnetic particle according to the present disclosure includes the Si and the Fe.

An average particle diameter of the raw material particles is not particularly limited, but D50=a diameter equal to or larger than about 1 μm and equal to or smaller than about 10 μm is preferably satisfied (i.e., from about 1 μm to about 10 μm).

Note that D50 is a particle diameter at which a cumulative volume of the alloy particle measured by a laser diffraction method is about 50%.

Subsequently, the raw material particle is mixed with Si alkoxide and alcohol.

The Si alkoxide is preferably tetraethoxysilane.

When the Si alkoxide is tetraethoxysilane, it is easy to form a coating film having a uniform thickness on the surface of the raw material particle.

In addition, the alcohol is preferably ethanol.

When the raw material particle is mixed with the Si alkoxide and the alcohol, it is preferable to add polyvinylpyrrolidone as a water-soluble polymer. In addition, it is preferable to add an aqueous ammonia solution as a basic catalyst. The Si alkoxide is likely to undergo hydrolysis in presence of a basic catalyst and water.

Forming Coating Film Forming Particle

Subsequently, the Si alkoxide is hydrolyzed and dried, thereby producing a coating film forming particle in which a coating film containing silicon oxide is formed.

At this time, an average thickness of the coating film provided on the surface of the raw material particle is set to be equal to or larger than about 10 nm and equal to or smaller than about 30 nm (i.e., from about 10 nm to about 30 nm).

When the average thickness of the coating film is larger than or equal to about 10 nm and smaller than about 15 nm (i.e., from about 10 nm to about 15 nm), since the coating film is thin, Fe in the Fe oxide film easily diffuses to a portion close to an outer side portion of the coating film until densification of the coating film starts. When the densification of the coating film starts in a state where Fe has diffused to the portion close to the outer side portion of the coating film, it is considered that Fe is extruded to the outer side portion of the coating film and the fourth oxide layer is formed.

On the other hand, when the average thickness of the coating film is larger than or equal to about 15 nm and smaller than or equal to about 30 nm (i.e., from about 15 nm to about 30 nm), since the coating film is thick, it is considered that Fe in the Fe oxide layer is unlikely to diffuse to the portion close to the outer side portion of the coating film until the densification of the coating film starts, and the fourth oxide layer is less likely to be formed.

That is, in a case where Fe has diffused to the portion close to the outer side portion of the coating film, it is considered that Fe in the portion close to the outer side portion of the coating film moves to the outer side portion of the coating film due to the densification of the coating film to form the fourth oxide layer. On the other hand, in a case where Fe has not diffused to the portion close to the outer side portion of the coating film, it is considered that Fe in the coating film is pushed back inside the coating film along with the densification of the coating film, and thus the fourth oxide layer is not formed.

Performing Heat Treatment on Coating Film Forming Particle

Subsequently, the coating film forming particle is subjected to heat treatment in an oxidizing atmosphere, thereby forming an oxide layer on the surface of the alloy particle.

A temperature of the heat treatment is equal to or higher than about 750° C. and equal to or lower than about 850° C. (i.e., from about 750° C. to about 850° C.).

It is considered that the densification of the coating film does not progress before the temperature of the heat treatment reaches a temperature equal to or larger than about 750° C., and diffusion of Fe from the Fe oxide film to the coating film is performed.

Moreover, when the densification of the coating film starts, in a case where Fe diffuses close to the surface of the coating film, Fe moves to the outer side portion of the coating film to form the fourth oxide layer. On the other hand, in a stage where the densification of the coating film progresses, in a case where Fe does not diffuse close to the surface of the coating film, it is considered that Fe that has diffused to the coating film is pushed back to the inner side due to the densification of the coating film to be integrated with the second oxide layer.

A period of time for the heat treatment of the coating film forming particle in the oxidizing atmosphere is not particularly limited, but the period of time for the heat treatment at the temperature equal to or larger than about 750° C. is preferably equal to or longer than about 10 minutes and equal to or shorter than about 50 minutes (i.e., from about 10 minutes to about 50 minutes).

When the period of time of the heat treatment is within the above-described range, Fe in the Fe oxide film easily diffuses to the coating film, and thus the fourth oxide layer is easily formed.

Method for Manufacturing Metal Magnetic Core

A method for manufacturing a metal magnetic core according to preferred embodiments of the present disclosure includes mixing raw material particles each of which has, on a surface of an alloy particle containing Fe and Si, an Si oxide film and an Fe oxide film from a side of the alloy particle with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is equal to or larger than 10 nm and equal to or smaller than 30 nm (i.e., from 10 nm to 30 nm), and a temperature of the heat treatment is equal to or higher than 750° C. and equal to or lower than 850° C. (i.e., from 750° C. to 850° C.).

In the method for manufacturing the metal magnetic core according to the present disclosure, by performing the heat treatment in the oxidizing atmosphere on the molded body obtained by molding the coating film forming particles obtained by forming the coating film containing the silicon oxide on the surface of each of the raw material particles each of which has the Si oxide film and the Fe oxide film from the side of the alloy particle, similarly to the method for manufacturing the metal magnetic particle according to the present disclosure, the Fe oxide film can be diffused to an outer side portion of the coating film to form the fourth oxide layer. In addition, it is possible to obtain the metal magnetic core in which the alloy particles are joined to each other by the oxide layer.

Among the respective processes configuring the method for manufacturing the metal magnetic core according to the present disclosure, the processes other than the molding are common to those of the method for manufacturing the metal magnetic particle according to the present disclosure.

In the molding, granulated powder produced by mixing binder resin, a solvent, and the coating film forming particles and then removing the solvent may be molded, or a mixture of the binder resin, the solvent, and the coating film forming particles may be directly molded.

As the binder resin, epoxy resin, silicone resin, phenol resin, polyamide resin, polyimide resin, polyphenylene sulfide resin, ethyl cellulose, and the like are preferable.

Examples of the solvent include a polyvinyl alcohol aqueous solution, terpineol, and the like.

The molded body produced in the molding preferably has a shape corresponding to the shape of the metal magnetic core to be obtained.

Examples of the shape of the metal magnetic core include a substantially rod-like shape, a substantially cylindrical shape, a substantially ring shape, a substantially rectangular parallelepiped shape, and the like.

A molding pressure in the molding is not particularly limited, but it is preferably equal to or larger than about 100 MPa and equal to or smaller than about 700 MPa (i.e., from about 100 MPa to about 700 MPa).

In the method for manufacturing the metal magnetic core according to the present disclosure, the molding preferably includes laminating and pressing a green sheet containing the coating film forming particles.

When the molding includes laminating and pressing the green sheet including the coating film forming particles, a distance between the alloy particles becomes close to each other in the molded body before the heat treatment, and thus it is easy to obtain a metal magnetic core in which the alloy particles are joined to each other by the oxide layer.

The green sheet containing the coating film forming particles can be obtained by, for example, mixing a solvent containing binder resin and coating film forming particles to produce slurry, molding the slurry into a thin film by a doctor blade method or the like, and then removing the solvent.

As the binder resin and the solvent, similar materials to those in the production of the granulated powder may be suitably used.

The green sheet containing the coating film forming particles may be formed with a coil pattern or a part thereof by a conductive paste or the like.

The molding may include printing with and drying paste containing the coating film forming particles.

EXAMPLES

Hereinafter, examples in which the metal magnetic particle, the inductor, the method for manufacturing the metal magnetic particle, the metal magnetic core, and the method for manufacturing the metal magnetic core according to the present disclosure are more specifically disclosed will be described. It should be noted that the present disclosure is not limited to only these examples.

Example 1

Fe:Si=93.5:6.5 (a weight ratio) of FeSi alloy particle was obtained by the water atomization method.

A surface of the obtained FeSi alloy was observed with an STEM, and it was confirmed that two oxide layers each of which has an average thickness of about 10 nm were formed on a surface of the FeSi alloy particle.

By using XPS analysis, element analysis was performed in a depth direction from the surface of the FeSi alloy particle, and it was confirmed that there was a layer containing Fe on the surface side of the FeSi alloy particle, and in an inner side portion of the layer, there was a layer containing Si.

From the above-description, it was confirmed that a silicon oxide film having an average thickness of about 10 nm and an iron oxide film having an average thickness of about 10 nm were formed on the surface of the FeSi alloy particle.

The obtained FeSi alloy particle was used as the raw material particle.

Polyvinylpyrrolidone K30 was added to ethanol added with an aqueous ammonia solution and the FeSi alloy particles, and stirred to obtain a mixed solution. Tetraethoxysilane was added dropwise to the obtained mixed solution, and the mixed solution after the dropwise addition was stirred for 60 minutes to obtain slurry. The slurry was filtered, washed with acetone, and then dried at 60° C. to obtain coating film forming particles.

The coating film forming particles were embedded in resin, then a cross section thereof was polished and processed to obtain a thin piece with a focused ion beam (FIB) apparatus [SMI3050SE manufactured by Seiko Instruments Inc.], and thus a sample for STEM observation was produced. The sample for STEM observation was observed at a magnification of about 400000 times with an STEM (HD-2300A manufactured by Hitachi High-Technologies Corporation), and it was confirmed that the average thickness of the coating film was about 19 nm.

100 parts by weight of the obtained coating film forming particles were mixed with 6 parts by weight of epoxy resin and a polyvinyl alcohol aqueous solution to be dried, and then sieved to obtain granulated powder. The granulated powder was filled in a mold having a donut shape and having an outer diameter of 20 mm and an inner diameter of 10 mm, the mold was pressurized at 60° C. for 10 seconds at a pressure of 500 MPa, and the coating film forming particles were molded into a ring shape having an outer diameter of about 20 mm, an inner diameter of about 10 mm, and a thickness of about 2 mm.

The obtained ring was degreased and fired in a firing furnace, and a molded body (metal magnetic core) of metal magnetic particles as a fired body was obtained. The degreasing was performed in the atmosphere, and the temperature was raised to 400° C. at a temperature rising rate of 40° C./h, held for 30 minutes, and then naturally cooled. The firing was performed in the atmosphere, and the temperature was raised to 800° C. that was a peak temperature in 40 minutes, held for 20 minutes, and then naturally cooled. Three rings were produced, one ring was used for measurement by the STEM-EDX, one ring was used for measurement of the withstand voltage performance, and one ring was used for measurement of the relative permeability and the direct-current superposition characteristics.

Line Analysis by STEM-EDX

Figure 3:
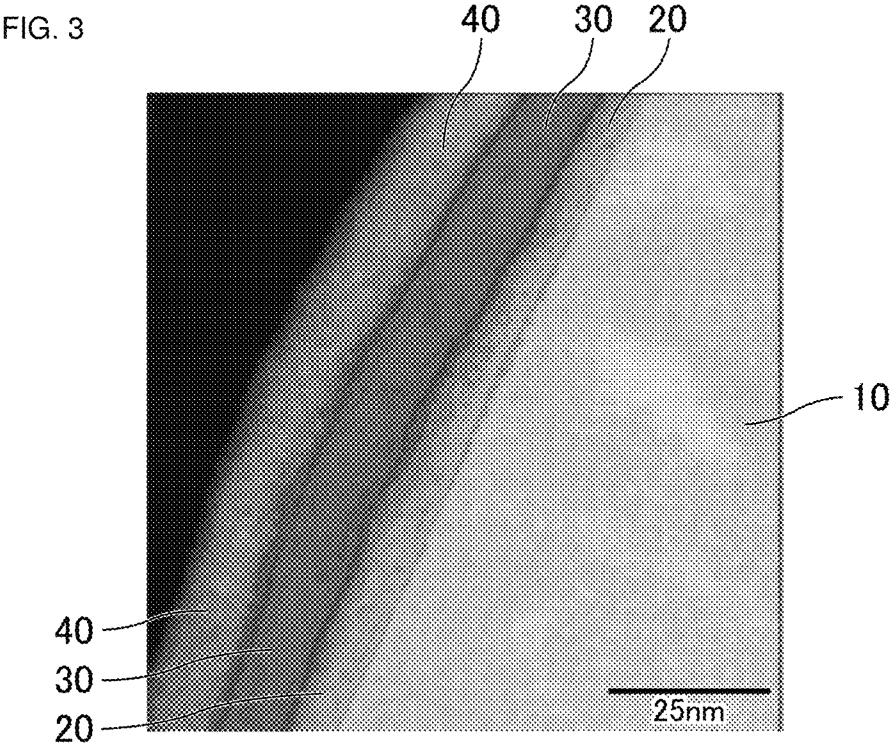
FIG. 3 is a STEM image of Example 1.
Figure 4:
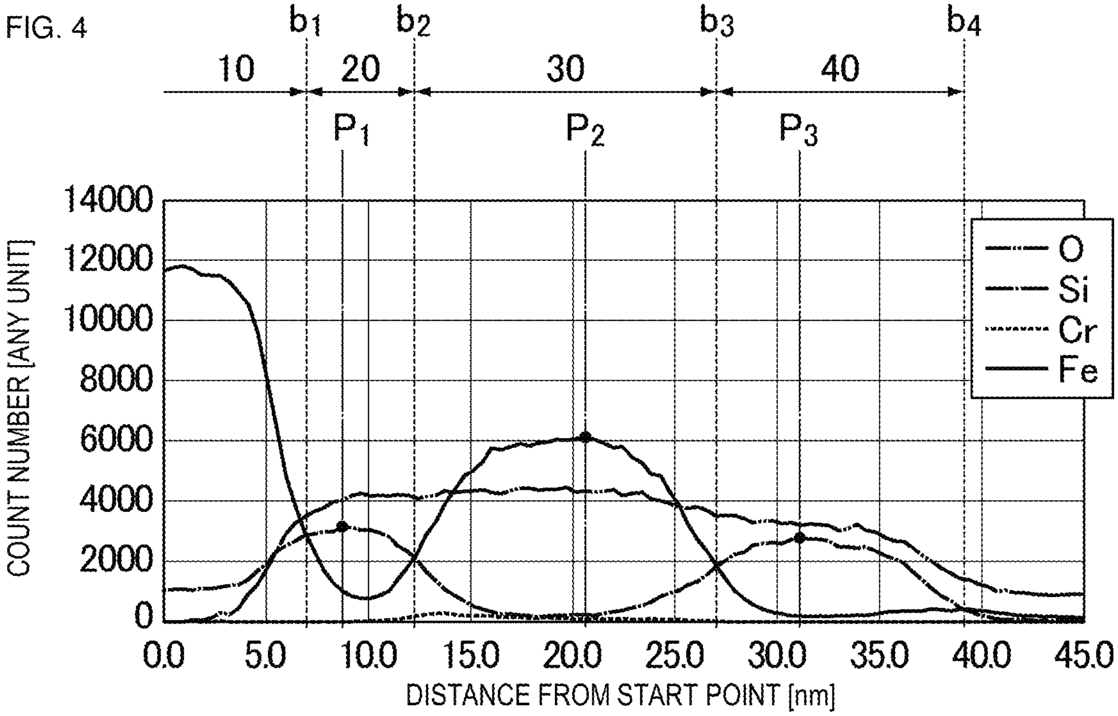
FIG. 4 is a diagram illustrating a result of line analysis in Example 1.

After the obtained ring was embedded in resin, the cross section thereof was polished and processed by an FIB to obtain a thin piece, and thus a sample for STEM observation was prepared. By using the STEM and EDX (GENESIS XM4 manufactured by EDAX Inc.), line analysis of the sample for STEM measurement is performed. A start point was the inside of an alloy particle, and element analysis was performed toward an outer side portion (the oxide layer). The magnification of the STEM was 400000 times. The STEM image is shown in FIG. 3, and the result of the line analysis is illustrated in FIG. 4. Note that the vertical axis represents a count number [any unit] of characteristic X-rays (K-lines) of each element, and the horizontal axis represents a distance [nm] from the start point. The horizontal axis was measured at intervals equal to or shorter than 0.9 nm.

From FIG. 3, it was confirmed that the first oxide layer 20, the second oxide layer 30, and the third oxide layer 40 were disposed in this order on the surface of the alloy particle 10.

Note that it was also confirmed from the STEM image that the alloy particles were joined to each other with the first oxide layer, the second oxide layer, or the third oxide layer interposed therebetween.

From FIG. 4, the thickness of the first oxide layer was 5.5 nm, the thickness of the second oxide layer was 14.7 nm, and the thickness of the third oxide layer was 11.4 nm.

From FIG. 4, it was confirmed that the oxide layer had the first oxide layer 20 in which the Si content took a local maximum value, the second oxide layer 30 in which the Fe content took a local maximum value, and the third oxide layer 40 in which the Si content took a local maximum value. In addition, it was confirmed that the alloy particle and the oxide layer contained almost no Cr.

The ratio of the Fe content to the Si content at the point where the Si content in the first oxide layer took the local maximum value (Fe content/Si content) was 0.33, the ratio of the Fe content to the Si content at the point where the Fe content in the second oxide layer took the local maximum value (Fe content/Si content) was 25, and the ratio of the Fe content to the Si content at the point where the Si content in the third oxide layer took the local maximum value (Fe content/Si content) was 0.070.

Further, it was confirmed that the fourth oxide layer was not formed since there was no local maximum value of the Fe content exceeding 10% of the local maximum value of the Fe content in the second oxide layer 30 at an outer side portion (a position at which a distance is far from the start point) than the third oxide layer 40.

In FIG. 4, the alloy particle 10 is from the start point to a first boundary $b_1$ at which the Fe content and the Si content are reversed.

The first oxide layer 20 is from the first boundary $b_1$ to a second boundary $b_2$ at which the Si content and the Fe content are reversed.

The second oxide layer 30 is from the second boundary $b_2$ to a third boundary $b_3$ at which the Fe content and the Si content are reversed.

The third oxide layer 40 is from the third boundary $b_3$ to a fourth boundary $b_4$ that is a point at which the O content becomes 34% of the maximum value.

Further, it was confirmed from the FFT image obtained by performing Fourier-transformation on the STEM image that the first oxide layer was amorphous, the second oxide layer was crystalline, and the third oxide layer was amorphous.

Measurement of Withstand Voltage Performance

The withstand voltage performance was measured in a thickness direction of the ring. The measurement was performed with a digital ultra-high resistance/micro-ammeter (R8340A manufactured by ADVANTEST CORPORATION) in a state where the probe attached thereto pinched the ring, to record a resistance value [Ω] when a predetermined voltage was applied. The applied voltage was swept, from 1 V to 10 V in increments of 1 V, and from 10 V to 1000 V in increments of 10 V, until the resistance value was lower than $10^5$ [Ω]. The applied voltage [V] immediately before the resistance value was lower than $10^5$ [Ω] was recorded, and the electric field intensity [V/mm] was calculated by dividing the thickness of the ring by the recorded voltage. The results are shown in Table 1.

Note that, in a case where the resistance value was not lower than $10^5$ even at 1000 V that was the maximum applied voltage of the measurement apparatus, the electric field intensity was denoted as equal to or larger than a value obtained by dividing the resistance value [Ω] at 1000 V by the thickness of the ring in the Table 1.

Measurement of Relative Permeability

The ring was impregnated with epoxy-based resin to improve mechanical strength, and then, the relative permeability was measured by using an impedance analyzer (E4991A manufactured by Keysight Technologies, Inc.). The relative permeability employed a value at 1 MHz. The results are shown in Table 1.

Measurement of Direct-Current Superposition Characteristics

Further, a copper wire having a diameter of 0.35 mm was wound 24 times around the ring, and the direct-current superposition characteristics were measured by using an LCR meter (4284A manufactured by Keysight Technologies, Inc.). A direct current of 0 to 30 A was applied to the copper wire to obtain an L value, the relative permeability (μ value) was calculated from the obtained L value, and a current value (Isat@−20%) at which the μ value was decreased to 80% of the initial value was obtained. From Isat@−20%, the ring size, and the number of turns of the copper wire, Hsat@−20% [kA/m] that was a magnetic field in which the μ value was 80% of the initial value was obtained. The results are shown in Table 1.

Note that the ring in which the copper wire is wound is also the inductor according to the present disclosure.

Examples 2 and 3

The ring was produced in a similar procedure to Example 1 except that a pressure for molding the coating film forming particles was changed to each of 300 MPa and 100 MPa, and the electric field intensity, the resistance value, the relative permeability, and the Hsat@−20% were obtained. The results are shown in Table 1.

Example 4

The ring was produced in a similar procedure to Example 1 except that the peak temperature of the heat treatment was changed from 800° C. to 780° C., and the electric field intensity, the resistance value, the relative permeability, and the Hsat@-20% were obtained. The results are shown in Table 1.

Comparative Examples 1 to 3

The ring was produced in a similar procedure to each of Examples 1 to 3 except that the raw material particles were used instead of the coating film forming particles, and the temperature of the heat treatment was changed to 690° C., and the electric field intensity, the resistance value, the relative permeability, and the Hsat@-20% were measured. The results are shown in Table 1.

Comparative Examples 4 to 6

The ring was produced in a similar procedure to each of Examples 1 to 3 except that the raw material particles were used instead of the coating film forming particles, and the electric field intensity, the resistance value, the relative permeability, and the Hsat@-20% were measured. The results are shown in Table 1.

TABLE 1

| | Manufacturing Conditions | | | Characteristics | | | |
|---|---|---|---|---|---|---|---|
| | Average Thickness of Coating Film [nm] | Molding Pressure [MPa] | Heat Treatment Temperature [° C.] | Electric Field Intensity [V/mm] | Resistance Value [$10^8$ Ω] | Relative Permeability | Hsat@-20% [kA/m] |
| Example 1 | 19 | 500 | 800 | Equal to or More Than 745 | 12000* | 19.7 | 16.5 |
| Example 2 | 19 | 300 | 800 | Equal to or More Than 745 | 8000* | 15.0 | 21.0 |
| Example 3 | 19 | 100 | 800 | Equal to or More Than 745 | 79000* | 10.5 | 31.4 |
| Example 4 | 19 | 500 | 780 | Equal to or More Than 745 | 3600* | 20.2 | 16.0 |
| Comparative Example 1 | — | 500 | 690 | 488 | 7.5 | 24.3 | 10.1 |
| Comparative Example 2 | — | 300 | 690 | 327 | 10 | 17.8 | 13.9 |
| Comparative Example 3 | — | 100 | 690 | 273 | 12 | 11.8 | 23.4 |
| Comparative Example 4 | — | 500 | 800 | 351 | 4.7 | 23.8 | 10.2 |
| Comparative Example 5 | — | 300 | 800 | 460 | 9 | 15.6 | 17.6 |
| Comparative Example 6 | — | 100 | 800 | 576 | 14 | 7.4 | 30.2 |

*The resistance value at 1000 V was denoted because the resistance value did not fall below $10^5$ [(Ωm] at 1000 V that was the maximum applied voltage of the apparatus.

From the results in Table 1, it can be seen that the metal magnetic particles according to the present disclosure have high electric field intensities and excellent withstand voltage performance as compared with Comparative Examples 1 to 6 in which the coating film forming particles are not formed.

Note that it is considered from comparison between Comparative Examples 1 to 3 and Comparative Examples 4 to 6 that when the heat treatment is performed at 800° C. on the raw material particle in which the coating film is not formed, the relative permeability is reduced by the progress of the oxidation of the alloy particle.

Figure 5:
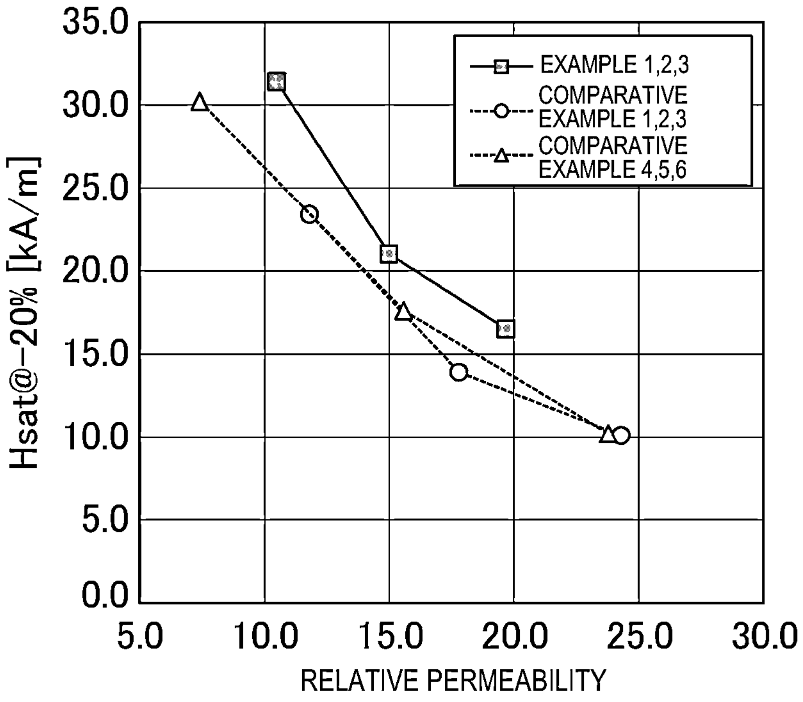
FIG. 5 is a graph illustrating a relationship between a direct current magnetic field Hsat@−20% [kA/m] (the vertical axis) when a value of relative permeability becomes equal to or smaller than 80% of an initial value and the relative permeability (the horizontal axis) in each of examples and comparative example.

In addition, FIG. 5 illustrates a relationship between the relative permeability (horizontal axis) and the Hsat@−20% [kA/m] (vertical axis) in each of Examples and Comparative Examples. From FIG. 5, it was confirmed that plot positions of the metal magnetic particles according to Examples 1 to 3 shifted to the upper right side, compared to the metal magnetic particles according to Comparative Examples 1 to 3 and Comparative Examples 4 to 6. From this, it can be confirmed that the value of Hsat@-20% tends to be improved when the relative permeability is substantially the same, and it can be found that the metal magnetic particle according to the present disclosure has excellent direct-current superposition characteristics.

Relationship Between Temperature of Heat Treatment and Rdc of Inductor

Comparative Example 7

A multilayer inductor according to Comparative Example 7 was produced by the following processes.

First, 2.5 parts of polyvinyl acetate as binder resin and terpineol as a solvent were added to 100 parts of the coating film forming particles produced in Example 1, and the mixture was kneaded to form slurry. Thereafter, a magnetic sheet having a thickness of about 12 μm was obtained by a doctor blade method.

The magnetic sheet was subjected to predetermined laser processing to form a via hole having a diameter equal to or longer than about 20 μm and equal to or shorter than about 30 μm. Ag paste was used on a specific sheet having a via hole to fill the via hole, and a conductor pattern (coil conductor) for predetermined coil winding having a thickness of about 11 μm was screen-printed and dried to obtain a coil sheet.

The coil sheets were laminated in a predetermined order so that a coil having a circumferential axis in a direction parallel to a mounting surface was formed inside a multilayer body after singulation.

The multilayer body was molded at a pressure of 690 MPa, then heat-treated at 690° C., and cut such that each chip has a predetermined chip dimension, thereby obtaining singulated chips.

Base electrodes of outer electrodes were formed on four surfaces (a main surface, an end surface, and both side surfaces) of the multilayer body by obliquely impregnating a layer obtained by stretching Ag paste so as to have a predetermined thickness with the chip and then firing the layer.

An Ni film and an Sn film each of which has a predetermined thickness were sequentially formed on the base electrode by plating to form an outer electrode.

According to the procedure described above, the multilayer inductor according to Comparative example 7 was produced.

Example 5

A multilayer inductor according to Example 5 was produced in a similar procedure to Comparative Example 7 except that the temperature of the heat treatment was changed to 800° C.

The direct current resistance (Rdc) of the multilayer inductor according to each of Comparative Example 7 and Example 5 was measured by using the LCR meter. Each measurement was performed by using 20 samples, and the average value was obtained. The results are shown in Table 2.

TABLE 2

| | Heat Treatment Temperature [° C.] | Direct Current Resistance Rdc [m[Ω] |
|---|---|---|
| Comparative Example 7 | 690 | 124.2 |
| Example 5 | 800 | 120.0 |

From the results in Table 2, it was confirmed that the direct current resistance (Rdc) was decreased by changing the temperature of the heat treatment from 690° C. to 800° C. This is considered because by changing the temperature of the heat treatment from 690° C. to 800° C., sintering of the Ag paste used in an inner electrode progresses, and thus, a specific resistance is reduced, and the direct current resistance (Rdc) is reduced. Therefore, in the inductor in which the inner electrode is formed by firing, it is considered that the direct current resistance (Rdc) is low and a power loss due to heat generation is small.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A metal magnetic core, comprising:

metal magnetic particles, the metal magnetic particles comprising:

an oxide layer formed on a surface of an alloy particle containing Fe and Si, the oxide layer including a first oxide layer, a second oxide layer, and a third oxide layer, the first oxide layer is formed directly on the alloy particle, the second oxide layer formed over the first oxide layer, and the third oxide layer formed over the second oxide layer, and wherein in line analysis of element content by using a scanning transmission electron microscope-energy dispersive X-ray spectroscopy, the first oxide layer is a layer in which Si content takes a local maximum value, and the first oxide layer contains Fe and Si, the second oxide layer is a layer in which Fe content takes a local maximum value, the amount of Fe in the second oxide layer is greater than the amount of Si in the second oxide layer, the third oxide layer is a layer in which Si content takes a local maximum value, and the metal magnetic particles are joined to each other with the oxide layer to form the metal magnetic core.

2. A metal magnetic core according to claim 1, wherein a weight percentage of Si in the alloy particle is from 1.5 parts by weight to 8.0 parts by weight with respect to 100 parts by weight of a total weight of the Fe and the Si.

3. A metal magnetic core according to claim 1, wherein the alloy particle contains smaller than 1.0 part by weight of Cr with respect to 100 parts by weight of a total weight of the Fe and the Si.

4. A metal magnetic core according to claim 1, wherein the oxide layer further includes a fourth oxide layer provided on a surface of the third oxide layer, and in line analysis of element content by using a scanning transmission electron microscope-energy dispersive X-ray spectroscopy, the fourth oxide layer is a layer in which Fe content takes a local maximum value.

5. An inductor comprising:

the metal magnetic core according to claim 1.

6. A metal magnetic core according to claim 2, wherein the alloy particle contains smaller than 1.0 part by weight of Cr with respect to 100 parts by weight of a total weight of the Fe and the Si.

7. A metal magnetic core according to claim 2, wherein the oxide layer further includes a fourth oxide layer provided on a surface of the third oxide layer, and in line analysis of element content by using a scanning transmission electron microscope-energy dispersive X-ray spectroscopy, the fourth oxide layer is a layer in which Fe content takes a local maximum value.

8. A metal magnetic core according to claim 3, wherein the oxide layer further includes a fourth oxide layer provided on a surface of the third oxide layer, and in line analysis of element content by using a scanning transmission electron microscope-energy dispersive X-ray spectroscopy, the fourth oxide layer is a layer in which Fe content takes a local maximum value.

9. A metal magnetic core according to claim 6, wherein the oxide layer further includes a fourth oxide layer provided on a surface of the third oxide layer, and in line analysis of element content by using a scanning transmission electron microscope-energy dispersive X-ray spectroscopy, the fourth oxide layer is a layer in which Fe content takes a local maximum value.

10. An inductor comprising:

the metal magnetic core according to claim 2.

11. An inductor comprising:

the metal magnetic core according to claim 3.

12. An inductor comprising:

the metal magnetic core according to claim 4.

13. A metal magnetic core according to claim 1, wherein a ratio of the Fe content to the Si content (Fe content/Si content) at the point where Fe content of the second oxide layer takes the local maximum value is equal to or larger than about 22 and equal to or smaller than about 27.

14. A metal magnetic core according to claim 1, wherein a maximum value of Fe content in the first oxide layer is greater than a maximum value of Fe content in the third oxide layer.

15. A metal magnetic core according to claim 1, wherein a minimum value of Fe content in the first oxide layer is greater than a minimum value of Fe content in the third oxide layer.

* * * * *